: 2,759,011
Patented Aug. 14, 1956

2,759,011
HALO-SUBSTITUTED BICYCLIC COMPOUNDS

Samuel B. Soloway, Denver, Colo., assignor to Shell Development Company, New York, N. Y., a corporation of Delaware No Drawing. Application March 14, 1955,
Serial No. 494,280

8 Claims. (Cl. 260—464)

This invention relates to new substituted bicyclic compounds. More particularly, the present invention relates to a novel group of compounds which may be prepared by reacting certain halo-substituted bicyclic aldehydes with organic compounds containing an activated methylene radical.

The compounds of this invention have the structural formula

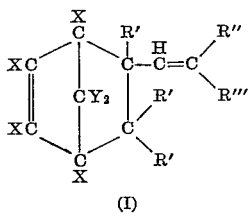

(I)

in which X represents a middle halogen, i. e., bromine or chlorine; Y represents a middle halogen, hydrogen, or methoxy radical; R' represents a hydrogen or a lower alkyl radical, such as a methyl, ethyl, n-propyl, isopropyl, butyl or pentyl radical; and R'' and R''' represent monovalent radicals independently selected from the class consisting of acyl, carboxyl, and radicals hydrolyzable to carboxyl. The preferred class of compounds are those in which X and Y represent chlorine.

These compounds may be prepared according to the reaction graphically set forth below,

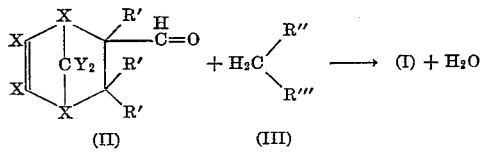

in which X, Y, R', R'' and R''' are the same as above.

The halo-substituted bicyclic aldehydes (II) utilized in this invention are prepared by the reaction of suitable cyclopentadienes and lower 2-alkenals to produce a 1:1 adduct of the two reactants. Thus, in this manner 1,4,5,6,7,-7-hexachlorobicyclo(2.2.1) - 5 - heptene - 2 - carboxaldehyde is prepared from hexachloro-1,3-cyclopentadiene and acrolein; 1,4,5,6-tetrachloro-7,7-methoxybicyclo(2.-2.1)-5-heptene-2-carboxaldehyde is prepared in this manner from 1,2,3,4-tetrachloro-5,5-dimethoxy-1,3-cyclopentadiene and acrolein; 1,4,5,6,7,7-hexachloro-2,3-dimethylbicyclo(2.2.1) - 5 - heptene - 2 - carboxaldehyde is prepared in this manner from hexachloro-1,3-cyclopentadiene and alpha-methylcrotonaldehyde; 1,4,5,6,7,7-hexachloro - 2 - methylbicyclo(2.2.1) - 5 - heptene - 2 - carboxaldehyde is prepared from hexachlorocyclo-1,3-pentadiene and methacrolein; 1,4,5,6,7,7-hexachloro-3-methylbicyclo(2.2.1) - 5 - heptene - 2 - carboxaldehyde is prepared from hexachloro-1,3-cyclopentadiene and crotonaldehyde; 1,4,5,6 - tetrachlorobicyclo(2.2.1) - 5 - heptene-2-carboxaldehyde is prepared from 1,2,3,4-tetrachloro-1,3-cyclopentadiene and acrolein; 1,4,5,6,7,7-hexabromobicyclo(2.2.1) - 5 - heptene - 2 - carboxaldehyde is prepared from hexabromo-1,3-cyclopentadiene and acrolein; 1,4,5,6 - tetrabromo - 2 - methylbicyclo(2.2.1) - 5-heptene-2-carboxaldehyde is prepared from 1,2,3,4-tetrabromo-1,3-cyclopentadiene and methacrolein; and 1,4,5,6,7,7 - hexabromo - 2,3 - dimethylbicyclo(2.2.1) - 5-heptene-2-carboxaldehyde is prepared from hexabromo-1,3-cyclopentadiene and alpha-methylcrotonaldehyde.

The method used in carrying out the above reaction may be illustrated by reference to the preparation of 1,4,5,6,7,7 - hexachlorobicyclo(2.2.1) - 5 - heptene - 2 - carboxaldehyde. Hexachlorocyclopentadiene (1.5 moles) and acrolein (2.0 moles) were mixed together and refluxed for 44 hours. The unconsumed reactants were then removed by distillation in vacuo. The reaction product 1,4,5,6,7,7-hexachlorobicyclo(2.2.1)-5-heptene-2-carboxaldehyde (419 g.) a pale yellow, waxy, crystalline, solid (melting point approximately 145–8° C.) was recovered from the remaining black residue by sublimation at 175° C. and 1.0 millimeter mercury pressure. By using this method under similar conditions the other reactions outlined above may be carried out.

Compounds (III) contain an activated methylene radical and represent a class of compounds that are commercially available. Suitable organic compounds containing an activated methylene radical contain an aliphatic carbon atom to which there is linked directly two atoms of hydrogen and to which there are also linked directly by univalent bonds two carbon atoms both of which are directly united by multiple bonds to atoms of one or more elements other than carbon, particularly atoms of nitrogen, oxygen, and/or divalent sulfur, and which have their remaining valencies, if any, satisfied by union with separate monovalent groups or atoms. The term aliphatic carbon atom is employed in the present specification and claims to refer to a carbon atom that is combined in aliphatic, as opposed to aromatic, linkages, and thus may include a carbon atom bound in a non-aromatic ring or alicyclic group. These compounds with which the substituted bicyclic aldehydes are condensed according to the invention contain a methylene radical activated by the direct attachment thereto, i. e., by attachment in geminate relation, of two radicals independently selected from the class consisting of acyl, carboxyl, and radicals hydrolyzable to carboxyl. More specifically these compounds (III) contain a saturated carbon atom bearing two atoms of hydrogen, to which there are linked two carbon atoms both of which are directly linked via multiple bonds to atoms of nitrogen, oxygen, or divalent sulfur.

Any compound containing an activated methylene radical may be employed for reaction with the present substituted bicyclic aldehydes.

One group of compounds to which the process of the invention may be applied with particular effectiveness comprises the beta-diketones and the beta-ketoaldehydes. Representative compounds are for example, acetylacetone, acetylpropionylmethane, acetylbutyrylmethane, acetylisobutyrylmethane, acetylcapropylmethane, butyrylisobutyrylmethane, formylacetone, alpha-propionylacetaldehyde, caproylacetaldehyde, and their homologs and analogs.

Another group of compounds containing an activated methylene radical to which the process of this invention may be applied comprises the beta-keto carboxylic acids and suitable derivatives of the beta-keto carboxylic acids. Representative members of this group are, for example, acetoacetic acid, propionylacetic acid, butyrylacetic acid, butyrylbutyric acid, decoylacetic acid and their homologs and analogs. Among the suitable derivatives there are included for example, the esters, particularly the monohydric alcohol esters, such as methyl, ethyl, propyl, isopropyl, butyl, capryl, decyl, and esters of higher monohydric alcohols, and salts of the beta-keto carboxylic acids, such as the salts thereof with the alkali metal hydroxides and alkaline earth metal hydroxides. Instead of salts and esters of these beta-keto carboxylic acids there may be employed suitable derivatives wherein the carboxyl group of the acid has been replaced by a nitrogen-containing group hydrolyzable to carboxyl, e. g., by a cyano group, a carbamyl group or N-substituted carbamyl, such as acetoacetic amide, N-alkyl acetoacetic amides, acetoacetic acid nitrile, iminoacetoacetic nitrile and their homologs and analogs.

A further valuable group of compounds containing the activated methylene radical and to which the process of this invention may be applied comprises the beta-dicarboxylic acids and their suitable derivatives. Illustrative of these compounds are malonic acid and derivatives of malonic acid wherein one or both of the carboxyl groups has or have been replaced by groups hydrolyzable to carboxyl, such as carboalkoxy, carbometalloxy, cyano, carbamyl or N-substituted carbamyl, etc. The following are representative of the suitable derivatives: esters, such as malonic monoethylester, malonic monomethyl ester, salts of mono-ester, i. e., sodium or potassium, diethyl malonate, malonyl chloride monoethyl ester, malonamic ester, iminomalonic acid ethyl ester; salts, such as dipotassium malonate and dicalcium malonate; mono- and dinitriles, such as cyanoacetic acid, ethyl cyanoacetate, malonitrile, cyanoacetamide, alpha-cyanopropionic acid ethyl ester, and malonamide. One or both of the radicals attached to the activated methylene radical may be substituted by alkyl, aryl, aralkyl, and/or alkaryl radicals.

The reaction between the halo-substituted bicyclic aldehydes and the compound containing the activated methylene group is effected according to the present invention by bringing the two reactants together in liquid phase, maintaining the mixture at reaction temperature until the reaction is substantially completed and then recovering the desired product from the reaction mixture.

The reaction may be accelerated and/or its course controlled by the application of heat to the reaction mixture, or by conducting the reaction in the presence of a suitable condensation catalyst, or by the application of both heat and a condensation catalyst.

Although the process of the invention may be conducted at temperatures throughout a relatively wide range, satisfactory yields of the desired products may be obtained by conducting the reaction in the liquid phase and at temperatures within the range of from about −20° C. to about 200° C., a preferred range being from about 10° C. to about 120° C. In the case of thermally-sensitive products which may be formed, e. g., geminate dicarboxylic acids, the use of maximum temperatures somewhat below these upper limits generally is preferable, for example, temperatures not over about 70° C. The optimum temperature for the formation of the desired product will depend upon the other conditions under which the reaction is effected, that is, whether or not a catalyst is present, whether a solvent medium is present and if so its identity, whether water is removed as formed from the reacting mixture, etc. The process is subject to variation as to the relative amounts of the respective reactants employed. Generally the compound containing the activated methylene radical will be employed in molar excess relative to the substituted bicyclic aldehydes, mole ratios of about 1:1 to about 10:1 being generally satisfactory.

The reaction whereby the desired products are formed may be accelerated by effecting it in the presence of a condensation catalyst. Suitable condensation catalysts include, among others, acids, acid salts, and substances which generate acid in situ, as well as alkaline-acting substances such as bases, basic salts, and substances which generate a base in situ. Suitable acidic or acid-forming condensation catalysts include, for example, mineral acids such as HCl, $H_2SO_4$, HBr, $H_3PO_4$, etc., as well as acidic salts, such as $NaH_2PO_4$, $NaHSO_4$, $ZnCl_2$, $FeCl_3$, and the like, and organic acids, such as acetic acid and other fatty acids, the anhydrides of the fatty acids, e. g., acetic anhydride and the like. Basic condensation catalysts include the alkali metal hydroxides, the alkaline earth metal hydroxides, the corresponding carbonates, and basic substances of organic character, such as amines, e. g., trimethylamine, pyridine, piperidine, methyl-ethyl-isobutylamine, beta-picoline, etc., and quaternary ammonium bases, e. g., benzyltrimethylammonium hydroxide. The acidic catalysts, particularly the strongly acidic catalysts, preferably are employed in moderate amount, for example, up to about 10% of the weight of the reactants. The reaction in such cases preferably is conducted under substantially anhydrous conditions. Since the substituted bicyclic aldehydes tend in themselves to react or condense in the presence of alkaline substances the strongly basic condensation catalysts, e. g., caustic alkalies, likewise are employed with caution as to the amounts of the basic condensation catalyst and the severity of the reaction conditions. Secondary and tertiary amines, e. g., di- and trialkyl-amines and polymethylene-imines, e. g., piperidine, may be employed with particular efficacy as the condensation catalyst, with the advantage that their use has a minimal tendency to favor the formation of undesired by-products and leads to formation in maximal yields of the desired products. Only small amounts of such amines need be used, amounts from about 0.02% to about 10% by weight of the reactants being generally satisfactory, and amounts from about 0.05 to about 2% by weight of the reactants being preferred.

The reaction between the substituted bicyclic aldehydes and the activated methylene compound may be effected in either a batchwise, an intermittent, or a continuous manner. The catalyst (if one is to be employed), the substituted bicyclic aldehydes, and the activated methylene compound may be mixed in a suitable reaction vessel and the mixture maintained at the desired reaction temperature until the reaction is substantially completed. It has been discovered that the rate of the reaction, and in certain cases even the course of the reaction, may be controlled or directed by controlling the water content of the reaction, as by continuously withdrawing water from the reaction mixture substantially as rapidly as it is generated therein by the reaction. Although any of various methods may be applied for withdrawing the evolved water, it is particularly convenient and efficacious to conduct the reaction in the presence of an added inert organic solvent which forms an azeotrope with water, and to conduct the reaction substantially at the boiling point of the reaction mixture thereby distilling the solvent-water azeotrope from the mixture during the reaction and removing the water evolved. Known solvents, such as benzene, toluene, chloroform, carbon tetrachloride, etc., which form water azeotropes may be employed. The reaction and the distillation may be carried out under atmospheric pressures, i. e., at the boiling point of the mixture under atmospheric pressures, or the reaction may be accomplished at higher or lower temperatures by conducting the distillation under superatmospheric pressures or subatmospheric pressures, respectively. The process of the invention may be executed in the presence of inert organic solvents while foregoing the withdrawal of evolved water. Substances which may be employed as solvents include, without being limited thereto, are pyridine, octane, dioxane, toluene, ethylene glycol, diethyl ether, dipropyl ether, ethyl acetate, and the like. The process preferably is conducted in the absence of added water, that is, in the absence of water other than that formed in the reaction.

The reaction upon which the present invention is based may be accomplished by the process which is illustrated in the following specific experiments. It is to be understood, however, that there is no intention of limiting the invention to the specific details presented in these examples, or to the specific products produced therein, and that numerous

Example I

In the preparation of

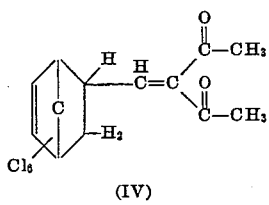

(IV)

1,4,5,6,7,7-hexachlorobicyclo(2.2.1)- 5 - heptene - 2 - carboxaldehyde (.2 mole), acetylacetone (.2 mole), and benzene (90 ml.) were mixed together. Piperidine (4 ml.) in benzene (10 ml.) was added slowly to the above mixture. The reaction mixture was refluxed for 2 hours under a condenser fitted with a Dean-Stark apparatus for the separation of water formed during the course of the reaction. The benzene was removed from the reaction mixture and the residue was decolorized with methanol and charcoal, crystallized, and recrystallized from cyclohexane. This resulted in a product having a melting point between 97° C. and 99° C. and a chlorine content of 51.5%. The theoretical chlorine content for compound IV is 51.8%.

By employing other diketones such as 2,4-hexanedione, 3,5-heptanedione, 6-methyl-2,4-heptanedione, and 2,4-heptanedione in the process of this example analogous reaction products are produced. For instance the use of 2,4-hexanedione (0.2 mole) results in the product 3 - (1,4,5,6,7,7-hexachlorobicyclo(2.2.1) - 5 - hepten - 2-ylmethylene)-2,4-hexanedione instead of the above 2,4-pentanedione.

Example II

In the preparation of

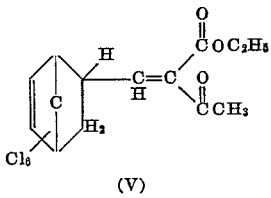

(V)

1,4,5,6,7,7 - hexachlorobicyclo(2.2.1) - 5 - heptene - 2-carboxaldehyde (.2 mole), ethyl acetoacetate (0.2 mole), and benzene (90 ml.) were mixed together. Piperidine (4 ml.) in benzene (10 ml.) was added slowly to the above mixture. The same procedure as Example I was followed and a product having a chlorine content of 48.4% was obtained. The theoretical content for compound V is 48.3%.

Likewise, the use of methyl acetoacetate, isopropyl acetoacetate, ethyl 3-oxopentanoate, methyl 3-oxo-4-methylpentanoate, and similar compounds may be used in place of the ethyl acetoacetate. Thus, ethyl alpha-propionyl - 1,4,5,6,7,7 - hexachlorobicyclo(2.2.1)-5-heptene-2-acrylate may be prepared by the use of ethyl 3-oxopentanoate (0.2 mole) in place of ethyl acetoacetate in the process of this example.

Example III

In the preparation of

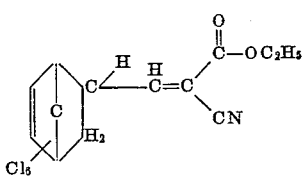

1,4,5,6,7,7-hexachlorobicyclo(2.2.1)-5-heptene - 2 - carboxaldehyde (.2 mole) and ethyl cyanoacetate (0.3 mole) were mixed together and piperidine (0.5 ml.) was slowly added. This mixture was then heated at 110° C. to 125° C. for four hours. The reaction mixture was then refluxed with benzene for three hours and the water formed during the reaction removed as in Example I. The benzene and excess ethyl cyanoacetate were removed. The residue representing a crude yield of 82.6 grams was crystallized from common solvents. The resulting product had a chlorine content of 52.0% chlorine and 2.90% nitrogen. Theoretical chlorine and nitrogen content for compound VI is 50.3% and 3.30% respectively.

Example IV

In the preparation of

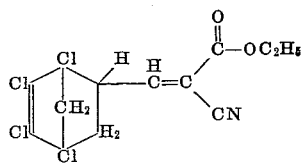

1,4,5,6-tetrachlorobicyclo(2.2.1)-5-heptene - 2 - carboxaldehyde (0.2 mole) and ethyl cyanoacetate (0.5 mole) were mixed together. Piperidine (1 ml.) was added slowly to the above mixture. The reaction was then heated to 100°–110° C. for eight hours. Benzene was added to the reaction mixture and the benzene solution was allowed to reflux as in previous examples for a period of 24 hours. Upon removal of the benzene and excess ethyl cyanoacetate a product yield of 69.0 grams was obtained. This reaction product upon analysis was found to contain 45% carbon, 3.58% hydrogen, and 40.2% chlorine.

Example V

In the preparation of

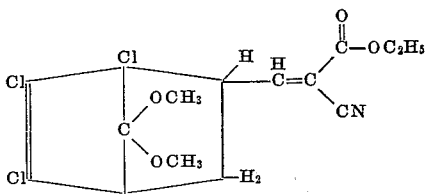

1,4,5,6-tetrachloro - 7,7 - methoxybicyclo(2.2.1)-5-heptene-2-carboxaldehyde was mixed with ethyl cyanoacetate (0.3 mole). Piperidine (1 ml.) was added to the above mixture. The reaction procedure was similar to Example IV and a 59.5 gram yield was obtained.

In Examples III to V cyanoacetates such as methyl cyanoacetate, isopropyl cyanoacetate, isobutyl cyanoacetate and so forth may be used successfully in place of ethyl cyanoacetate. The preparation of methyl alpha-cyano-1,4,5,6 - tetrachloro-7,7-methoxybicyclo(2.2.1)-5-heptene-2-acrylate is accomplished by the use of methyl cyanoacetate (0.3 mole) in Example V instead of ethyl cyanoacetate.

The new compounds of this invention are biologically active compounds useful especially for agricultural purposes. They are primarily, but not exclusively, useful as plant regulators which, when sprayed onto plants in low concentrations act, for example, to cause defoliation. Peaches and other orchard crops, cotton, ramie, vine berries, and other field crops can be defoliated by applying dilute solutions, e. g., 0.1% w. to 5% w., of the novel compounds in the light petroleum distillates or other known horticultural carriers to the plant foliage. The compounds of the invention also may be used to control or regulate the setting of fruit and, in sufficiently high concentrations, as phytotoxic or herbicidal agents.

Other fields in which the compounds are useful are in the compounding of lubricating oils of either the synthetic or natural variety, and in the blending or compounding of natural and synthetic rubbers.

The scope and spirit of this invention are set forth in the appended claims and only such limitations as appeared therein should be imposed upon the new and novel compounds and processes of this invention.

I claim as my invention:

1. A chemical compound of the structure

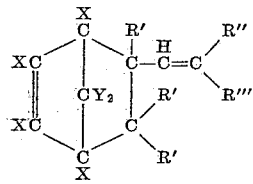

in which X is selected from the class consisting of chlorine and bromine; Y is selected from the class consisting of chlorine, bromine, hydrogen and methoxy radicals; R' is selected from the class consisting of hydrogen and lower alkyl radicals; and R'' and R''' represent monovalent radicals independently selected from the class consisting of acyl, carboxyl, carboalkoxy, carbometalloxy, cyano, and carbamyl.

2. The compounds of claim 1 in which X and Y represent a chlorine radical, R' represents a hydrogen radical, R'' represents a carboalkoxy radical, and R''' represents the cyano radical.

3. The compounds of claim 1 in which X, Y, R', R'', and R''' are chlorine, methoxy, hydrogen, carboalkoxy, and cyano radicals, respectively.

4. The chemical compound of the structure

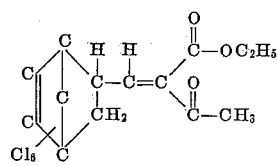

5. The chemical compound of the structure

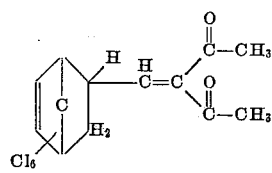

6. The chemical compound of the structure

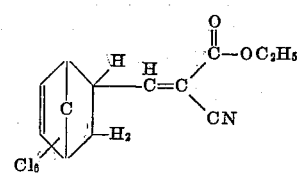

7. The chemical compound of the structure

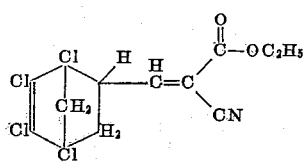

8. The chemical compound of the structure

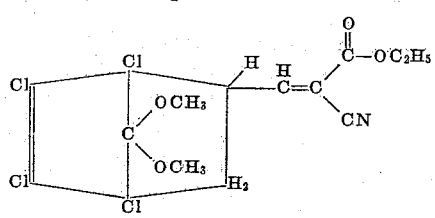

References Cited in the file of this patent

UNITED STATES PATENTS

| | | |
|---|---|---|
| 2,373,568 | Joy et al. | Apr. 10, 1945 |
| 2,552,567 | McBee et al. | May 15, 1951 |
| 2,583,194 | Weisler | Jan. 22, 1952 |

OTHER REFERENCES

Surrey: Name Reactions in Org. Chemistry (1954), pp. 105–6.

McBee et al.: J. A. C. S., vol. 77, 385–7 (Jan. 1955).